(No Model.)
T. MUELLER.
WATCH PENDANT.
No. 268,714. Patented Dec. 5, 1882.
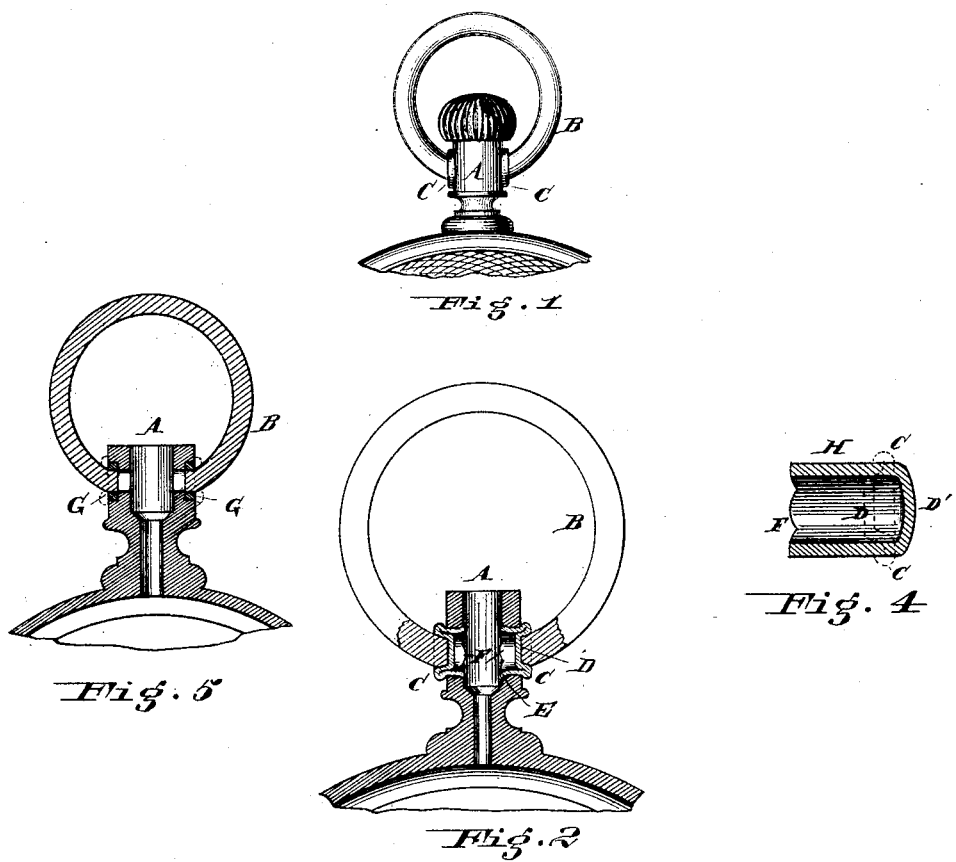
Attests
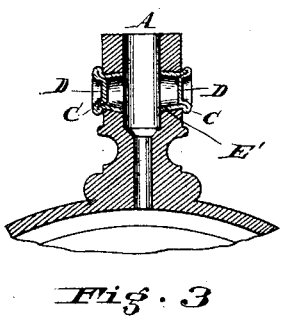
Inventor
Theodor Mueller
By his atty

UNITED STATES PATENT OFFICE.

THEODORE MUELLER, OF PHILADELPHIA, PENNSYLVANIA.

WATCH-PENDANT.

SPECIFICATION forming part of Letters Patent No. 268,714, dated December 5, 1882.

Application filed December 1, 1881. (No model.)

*To all whom it may concern:*

Be it known that I, THEODORE MUELLER, of the city and county of Philadelphia, and State of Pennsylvania, have invented an Improvement in Watch-Cases, of which the following is a specification.

My invention relates to pendants for watch-cases, but more particularly to the bushing or ears located therein, and to which the supporting-ring is pivoted; and my invention consists in securing bushings or ears in diametrically opposite sides of the pendant without the use of solder or its equivalent; further, in forming said bushings from cup-shaped pieces, which, while being forced into place by means of dies, are upset or expanded on the inner ends, and have the outer or closed ends forced inward to make a cup-shaped ear to support the ring; and, further, in the construction of said cup-shaped pieces, all of which is more fully set forth in the following specification and shown in the accompanying drawings, which form part thereof.

Heretofore it has been customary to insert rings or bushings turned out of metal into holes in the pendant and solder them in place, said bushings being provided with the extending rim to form what is technically called the "ears," and in which the supporting-ring is pivoted. The objections to the old construction lie in the fact that it is more difficult to fit said bushings in place, that the bushings have to be turned separately out of metal, and that the use of solder always requires great care, as the solder has a tendency to run over the adjacent parts of the pendant and mar the beauty of the watch-case. From the nature of the construction as heretofore carried on much loss of time was inevitable, thereby increasing the expense.

The object of my improvement is to dispense entirely with the use of solder, and in lieu thereof expand the pieces which form the bushings or ears after they have been inserted, and thus secure them firmly in position, and at the same time render them easily removable, if desired, for repairs. The cup-shaped pieces forming the bushings are stamped out of metal in large quantities, and after inserting one in each side of the watch-pendant they are quickly stamped into the requisite shape to form the ears, and at the same operation are clamped in place.

In the drawings, Figure 1 is an elevation of a watch-pendant with its ring and ears. Fig. 2 is a sectional elevation of same, showing my improvements. Fig. 3 is a sectional elevation of pendant with a modified method of securing the ears and bushings in the pendant. Fig. 4 is a sectional elevation of one of the cup-shaped bushings before being stamped into the requisite shape in the pendant; and Fig. 5 is a sectional elevation of a watch pendant and ring, and shows the old construction.

A is the watch-pendant, B is the ring, and C are the ears, forming part of the bushings H. The pendant is drilled entirely across through the central orifice for the push-pin, and into the two holes thus formed the cup or cap shaped pieces H are inserted with their closed ends D' outward and their scalloped edges F inward, and when in position said ends will project slightly into the push-pin cavity. After being inserted in position the pendant is placed under dies, and at one operation the scalloped edges F are expanded to secure the pieces H against coming out, and the head D' is pressed in to form the cup D and the ears C, which are expanded up around the pendant A, thus insuring the bushing from either being pushed in or out and dispensing entirely with the use of solder—a most important feature.

In place of putting the cupped bushings through cylindrical holes in the pendant and expanding the scalloped edges alone, as at E in Fig. 2, the holes may be made conical, the smallest diameter being on the outside, as shown in Fig. 3, and the cupped pieces made with their body expanded along their entire length E' to fit said conical holes.

In the old method of securing ears or sockets G to the pendant for the reception of the ring B, as shown in Fig. 5, they were turned to suit, and after being placed in position were soldered in the pendant, whereas by my improved construction I am enabled to make ears or sockets for watch-case pendants of thin sheet metal cupped and put in the pendant after drilling the same by suitable dies and forms, and without the use of solder or its equivalent.

I do not limit myself to the particular form of bushings herein shown or described, as they may be modified in various ways, as my invention comprehends broadly ears or sockets secured to watch-case pendants without the use of solder.

Having now described my invention, what I claim as new, and desire to secure by Letters Patent, is—

1. The herein-described article of manufacture, which consists of a watch-case the pendant of which is provided with ears or sockets to which the ring is pivoted, said ears or sockets being secured in place by having their inner and outer ends expanded in contradistinction to being soldered, substantially as and for the purpose specified.

2. Ears or sockets for the pendant of a watch-case, made of stamped sheet metal, having their closed ends pressed in to form a cup the rim of which is expanded so as to be of larger diameter than the body, substantially as and for the purpose specified.

3. An article of manufacture which consists of a watch-case pendant provided with holes diametrically opposite, or nearly so, in combination with ears or sockets made of stamped sheet metal and secured in said pendant by having their inner edges expanded, substantially as and for the purpose specified.

In testimony of which invention I hereunto set my hand.

THEODORE MUELLER.

Witnesses:
H. L. ROBERTS,
HENRY F. WALTON.